(12) United States Patent
Baker, IV et al.

(10) Patent No.: US 9,704,107 B1
(45) Date of Patent: Jul. 11, 2017

(54) PREMISE GENERATION BASED ON BOTH ANALYTICAL PROCESSES AND STATISTICAL PROCESSES

(71) Applicant: Connect Financial LLC, Wellesley, MA (US)

(72) Inventors: Charles F. Baker, IV, Brookline, MA (US); Benjamin Louis Anthony Katz, North Cambridge, MA (US); Tsehsin Jason Liu, Wellesley, MA (US)

(73) Assignee: Connect Financial LLC, Wellesley, MA (US)

( * ) Notice: Subject to any disclaimer, the term of this patent is extended or adjusted under 35 U.S.C. 154(b) by 0 days.

(21) Appl. No.: 15/231,266

(22) Filed: Aug. 8, 2016

(51) Int. Cl.
*G06N 99/00* (2010.01)
*G06N 5/02* (2006.01)

(52) U.S. Cl.
CPC .......... *G06N 99/005* (2013.01); *G06N 5/022* (2013.01)

(58) Field of Classification Search
CPC .................................................... G06N 7/005
USPC .......................................................... 706/46
See application file for complete search history.

(56) References Cited

U.S. PATENT DOCUMENTS

| 2015/0363862 A1 | 12/2015 | Ranft et al. |
| 2016/0232546 A1 | 8/2016 | Ranft et al. |

OTHER PUBLICATIONS

Chemweno et al ("Development of a risk assessment selection methodology for asset Maintenance decision making: An analytic network process(ANP) approach" 2015).* https://www.creditkarma.com/ [retrieved online on Oct. 6, 2016] 3 pages.
www.lendingtree.com [retrieved online on Oct. 6, 2016] 4 pages.
www.thezebra.com [retrieved online on Oct. 6, 2016] 1 page.
www.coverhound.com [retrieved online on Oct. 6, 2016] 6 pages.
www.bankrate.com [retrieved online on Oct. 6, 2016] 2 pages.
www.quinstreet.com [retrieved online on Oct. 6, 2016] 1 page.
www.whistleout.com [retrieved online on Oct. 6, 2016] 5 pages.
www.cardhub.com [retrieved online on Oct. 6, 2016] 4 pages.
www.creditcards.com [retrieved online on Oct. 6, 2016] 6 pages.
www.wallethub.com [retrieved online on Oct. 6, 2016] 6 pages.
www.magnifymoney.com [retrieved online on Oct. 6, 2016] 12 pages.
www.meetalbert.com [retrieved online on Oct. 6, 2016] 8 pages.
www.compare.com [retrieved online on Oct. 6, 2016] 5 pages.
www.zillow.com/mortgage-rates [retrieved online on Oct. 6, 2016] 5 pages.
www.everquote.com [retrieved online on Oct. 6, 2016] 7 pages.
www.learnvest.com [retrieved online on Oct. 6, 2016] 1 page.
www.hellowallet.com [retrieved online on Oct. 6, 2016] 5 pages.
https://www.fidelity.com/mymoney/meet-cinch [retrieved online on Oct. 6, 2016] 5 pages.
http://www.goji.com/ [retrieved online on Oct. 6, 2016] 2 pages.

(Continued)

*Primary Examiner* — Lut Wong
(74) *Attorney, Agent, or Firm* — Fish & Richardson P.C.

(57) ABSTRACT

Among other things, data is received representing a case for which an output premise is to be generated. The received data is processed to generate the output premise for the case. The processing includes both analytical processing and statistical processing. The analytical processing in the statistical processing are managed so that the output premise depends on results of the analytical processing that have been affected by the statistical processing, or on results of the statistical processing that have been affected by the analytical processing, or on both.

16 Claims, 9 Drawing Sheets

(56) References Cited

Figure 1:
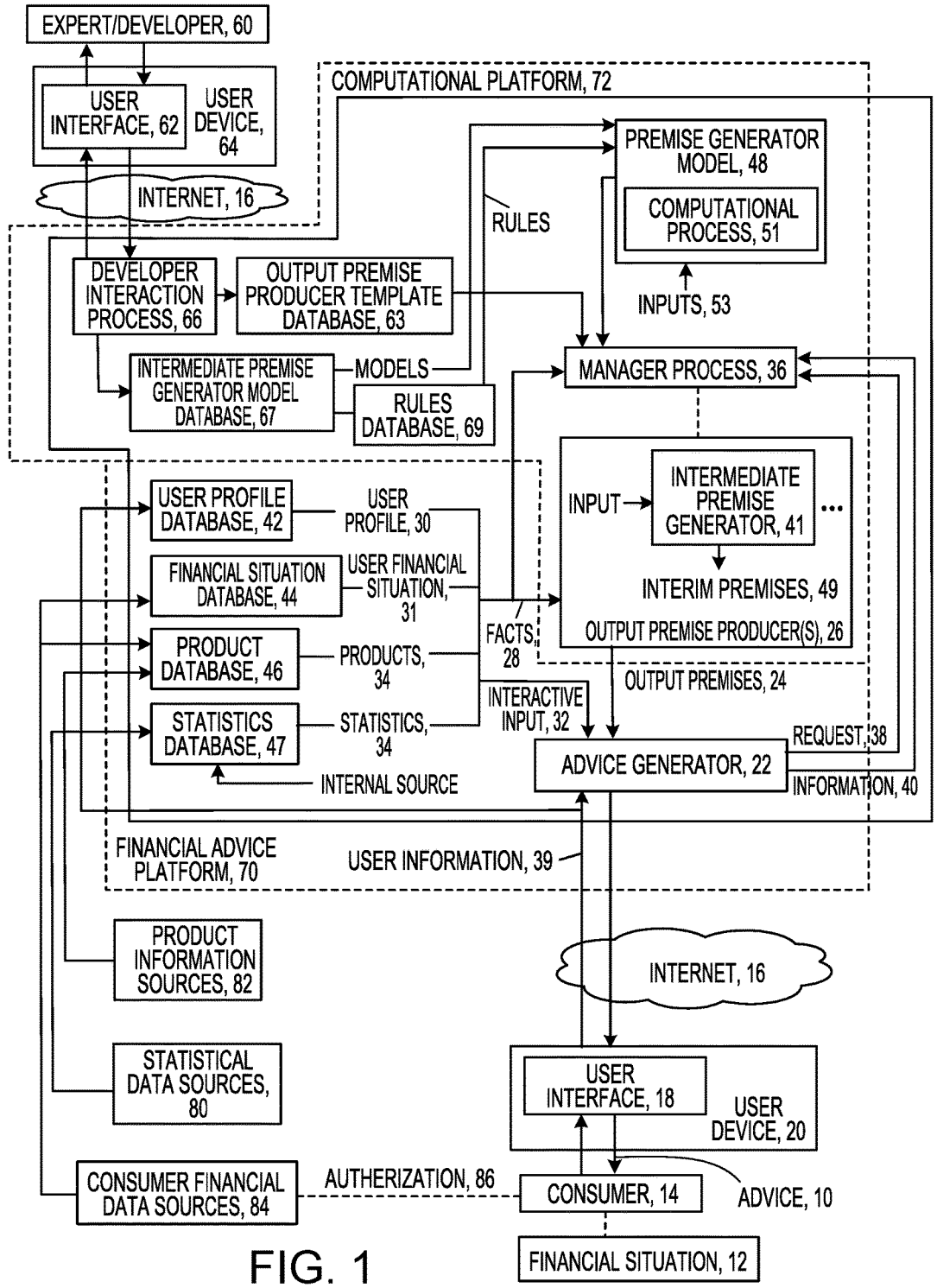

OTHER PUBLICATIONS www.betterment.com [retrieved online on Oct. 6, 2016] 5 pages.
www.personalcapital.com [retrieved online on Oct. 6, 2016] 7 pages.
www.asktrim.com [retrieved online on Oct. 6, 2016] 8 pages.
https://www.prosper.com/daily [retrieved online on Oct. 6, 2016] 14 pages.
www.wealthfront.com [retrieved online on Oct. 6, 2016] 4 pages.
www.youneedabudget.com [retrieved online on Oct. 6, 2016] 5 pages.
www.smartasset.com [retrieved online on Oct. 6, 2016] 3 pages.
www.daveramsey.com [retrieved online on Oct. 6, 2016] 11 pages.
Villena-Román et al., "Hybrid Approach Combining Machine Learning and a Rule-Based Expert System for Text Categorization," Proceedings of the Twenty-Fourth International Florida Artificial Intelligence Research Society Conference, May 18-20, 2011. https://www.aaai.org/ocs/index.php/FLAIRS/FLAIRS11/paper/viewFile/2532/3048.
Karthik Guruswamy, "Data Science—Machine Learning vs Rules Based Systems," Linked in, Oct. 6, 2015. https://www.linkedin.com/pulse/data-science-machine-learning-vs-rules-based-karthik-guruswamy.
Petasis et al., "Using Machine Learning to Maintain Rule-based Named-Entity Recognition and Classification Systems," 2001. https://www.aaai.org/ocs/index.php/FLAIRS/FLAIRS11/paper/viewFile/2532/3048.
Rule Learner: Integrated machine learning and business rules approach, Open Rules, Inc., 2003-2016. http://www.openrules.com/rulelearner.htm.
Card Matcher, "Use your credit rating to find the perfect card", Confused.com, On a mission to save you money, https://www.confused.com/credit-cards/CreditProfile/295358., Jun. 13, 2014 (1 page).
Wealthfront, Inc., "The global market is often volatile. If your entire investment portfolio lost 10% of its value in a month during a market decline, what would you do?", http://wealthfront.com/questions/, Jun. 13, 2014 (1 page).
Zillow, "Today's Home Loan Rates and Trends", Current Mortgage Rates and Home Loans, http://www.zillow.com/mortgages-rates/, Jun. 13, 2014 (5 pages).
Nerd Wallet, "Compare Best: Credit Cards", http://www.nerdwallet.com/, Jun. 13, 2014 (2 pages).
Credit Sesame, "Mange Your Personal Finances Online: Credit Score, Loans, Debt", http://www.creditsesame.com/, Jun. 13, 2014 (8 pages).
Credit Karma, "Free Credit Score & Credit Report Card", No Credit Card Needed, https://www.creditekarma.com/, Jun. 13, 2014 (5 pages).
Cinch, "Your Unbiased Expert for Everything Money", https://www.cinchfinancial.com/, Dec. 31, 2015 (5 pages).
Mint: Money manager, Bill Pay, Credit Score, Budgeting & Inventing, "Big Dreams Start with Baby Steps," http://www.mint.com/, Jan. 6, 2016 (8 pages).
U.S. Appl. No. 14/304,633, in the name of Connect Financial LLC, entitled "Financial Product Recommendation for a Consumer," filed Jun. 13, 2014.
U.S. Appl. No. 14/989,935, in the name of Connect Financial LLC, entitled "Computer Processing of Financial Product Information and Information About Consumers of Financial Products," filed Jan. 7, 2016.

\* cited by examiner

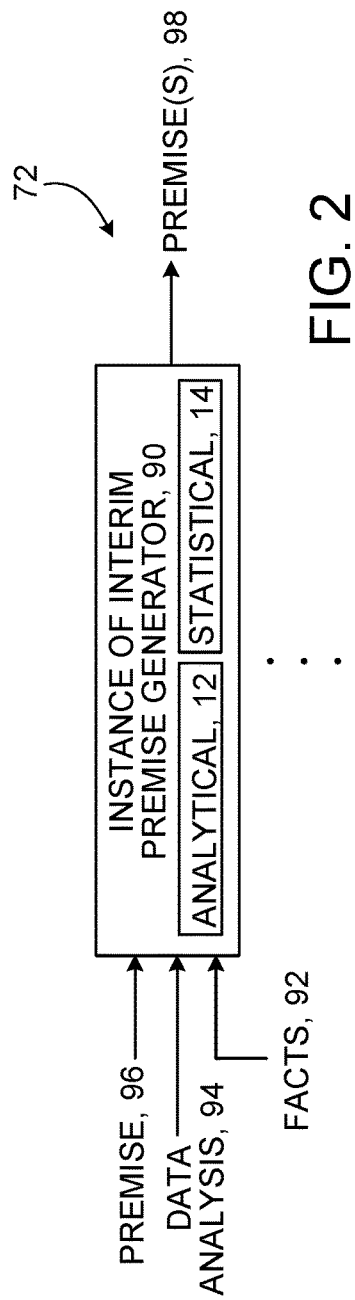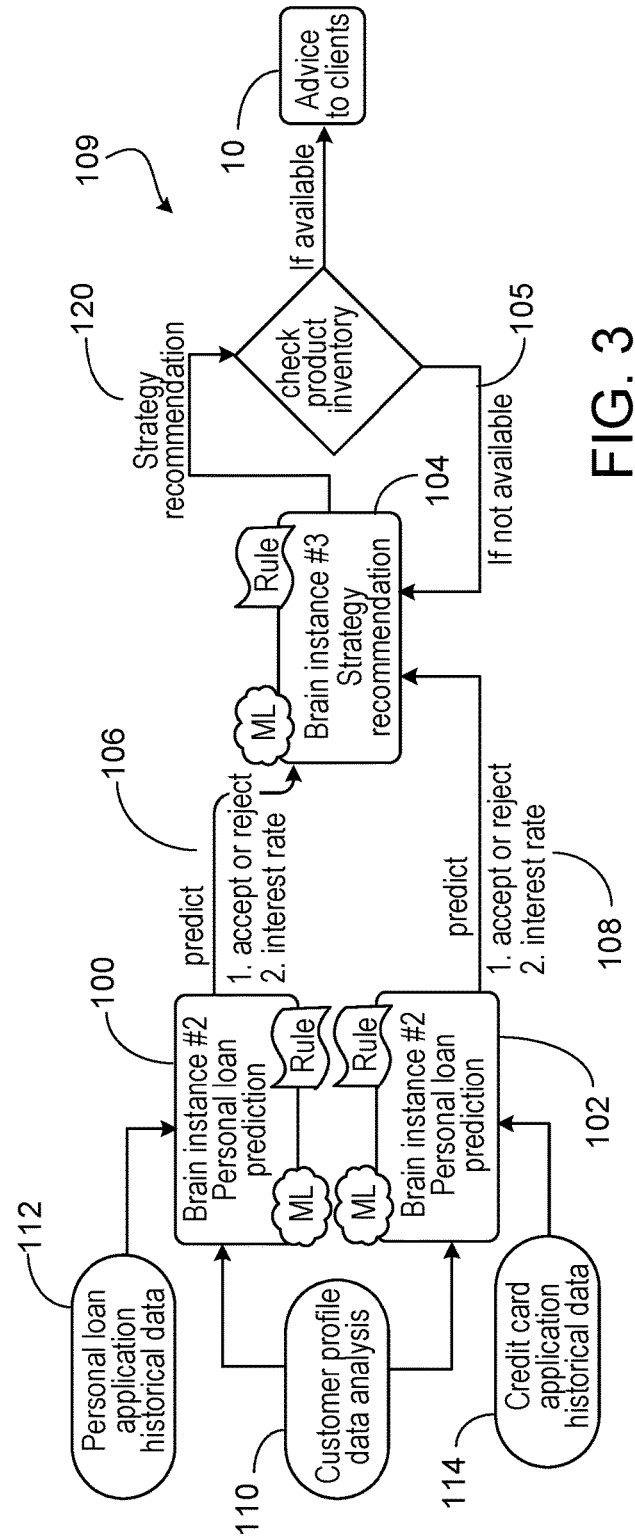

PREMISE GENERATION BASED ON BOTH ANALYTICAL PROCESSES AND STATISTICAL PROCESSES

This description relates to the description in U.S. patent application Ser. No. 14/304,633, filed Jun. 13, 2014, and Ser. No. 14/989,935, filed Jan. 7, 2016, the entire contents of both of which are incorporated by reference here.

This description relates to premise generation based on both analytical processes and statistical processes.

Analytical processes can be used to derive premises for specific cases by applying, for example, rules formulated by experts to facts of the specific cases. Statistical processes can be used to derive premises for specific cases by applying, for example, classifiers that are trained using statistically sufficient bodies of facts about other potentially analogous cases and known correct outcomes of those cases.

SUMMARY

In general, in an aspect, data is received representing a case for which an output premise is to be generated. The received data is processed to generate the output premise for the case. The processing includes both analytical processing and statistical processing. The analytical processing and the statistical processing are managed so that the output premise depends on results of the analytical processing that have been affected by the statistical processing, or on results of the statistical processing that have been affected by the analytical processing, or on both.

Implementations may include one or a combination of two or more of the following features. The analytical processing and statistical processing are managed by applying a cooperation logic to results of the analytical processing and results of the statistical processing. The cooperation logic includes treating results of the analytical processing and the statistical processing as votes in a majority voting process. The cooperation logic includes treating results of the analytical processing and the statistical processing in an order of priority determined by a user. The cooperation logic includes treating results of the analytical processing and the statistical processing in accordance with a choice made by a user. The cooperation logic includes treating results of the analytical processing and the statistical processing based on confidence levels. The confidence levels are associated with ranges of the received data that are suitable for the analytical processing or the statistical processing or both. The analytical processing and the statistical processing include respective processing perspectives, and the managing of the analytical processing and the statistical processing is based on the respective processing perspectives. At least one of the respective processing perspectives includes a conservative approach to the case. At least one of the respective processing perspectives includes an aggressive approach to the case. At least one of the respective processing perspectives includes balancing factors associated with the case. At least one of the respective processing perspectives includes applying inferences derived from computational analysis of data for other similar cases. The inferences are derived using trained random forests or decision trees. The inferences are derived using trained naïve Bayes algorithms. The analytical processing and the statistical processing are managed so that the output premise represents a hybrid of results of analytical processing and statistical processing. The statistical processing is applied first and a result of the statistical processing is audited by the analytical processing. A result of the analytical processing is used as the output premise unless the analytical processing fails. The managing the analytical processing and the statistical processing includes assigning subtasks to instances of analytical processing or statistical processing or both.

In general, in an aspect, a request is received for an output premise for a specified case. The specified case is susceptible to generation of the output premise using analytical processing or statistical processing or both. One or more premise generators is instantiated from premise generator models. Each of the premise generators can accept inputs and generate premises based on the accepted inputs and on analytical processing or statistical processing or both. Execution by the premise generators managed and the output premise is generated based on the premises generated by the instantiated premise generators. The output premise is provided in response to the request.

Implementations may include one or a combination of two or more of the following features. The premise generator models are predefined. The managing of the execution includes organizing a flow of the inputs and the premises to effect a correct output premise that is based on a coordinated application of both analytical processing and statistical processing. The request is received from a user application that will provide a premise through a user interface, the premise being based on the generated output premise. The user application includes a financial advice platform.

In general, in an aspect, the following are received from a user through a user interface: definitions of premise generator models, inputs to the premise generator models, premises to be generated by premise generator instances of the premise generator models, and for each of the premise generator models analytical processing or statistical processing or both to be used by each of the premise generator instances to generate the corresponding premise using the corresponding inputs. The premise generator models are stored for runtime use in generating the premise generator instances. The user is precluded from access to the premise generator models other than by providing the definitions through the user interface.

Implementations may include one or a combination of two or more of the following features. Specifications are received from the user for coordinating execution of premise generator instances and the inputs and premises at run time to generate correct output premises in response to received requests. Definitions are received from the user of permitted interactions at run time between the premise generator instances and a separate platform to be used to provide premises to end users.

In general, in an aspect, on behalf of an end-user of an application, a request is generated for an output premise to be used in providing advice to the end user with respect to a case. The request is communicated to a computational platform. The output premise is received from the computational platform that is based on a combination of analytical processing and statistical processing applied to input data associated with the end-user in the case. The advice is presented to the end user based on the output premise received from a computational platform.

Implementations may include one or a combination of two or more of the following features. The end-user is a consumer of products that affect a financial status of the consumer, the case includes an aspect of the financial status of the consumer, the output premise includes a recommendation concerning the financial status of the consumer, and the advice includes a suggestion to the consumer about an action related to the financial status of the consumer.

These and other aspects, features, implementations, and advantages, and combinations of them, can be expressed as methods, systems, components, apparatus, program products, methods of doing business, means and steps for performing functions, and in other ways.

These and other aspects, features, implementations, and advantages will become apparent from the following description and from the claims.

DESCRIPTION

FIGS. 1 through 4 are block diagrams.
FIGS. 5 through 10 are screen shots.

As shown in FIG. 1, in some implementations of the systems and techniques that we describe here, fiduciary-quality advice 10 about a financial situation 12 of a consumer 14 (i.e., a particular consumer "case") is given to the consumer from servers 23 through the Internet 16 and a user interface 18 of a user device 20. The advice about the case is communicated from an advice generator 22 based on one or more output premises 24 that have been determined about the case by one or more output premise producers 26. Each of the output premise producers produces its output premise or premises based on facts 28 about the case that are received as inputs.

The facts 28 used by the output premise producers can include facts 30 about the user's profile, facts 31 about the user's financial situation, facts 32 about interactive input (including choices) provided by the consumer through the user interface 18, facts 34 about products that relate to the consumer's financial situation, and statistically useful facts 35 about a large number of other consumers and their financial situations and outcomes, among other facts.

The statistics contained in the database 47 can obtained by the financial advice platform from a variety of external statistical data sources 80 and also from internal information developed by the financial advice platform or the computational platform. The product information in the database 46 similarly can be drawn from a wide variety of external product information sources, 82. The products can be relevant to consumers to consider in connection with planning and implementing their finances.

The user profile database 42 can be populated by information provided directly by the consumer and by other sources. The consumers themselves provide information directly about their demographic characteristics, financial behaviors, financial aspirations, and other aspects of their finances. The financial situation database 42 can be populated using data provided directly by the consumer and also from public and private sources that store information about the consumer's financial situation, for example, information from third party sources such as bank account information, credit card information, insurance information, and a wide variety of other private financial information. For private sources, authorization 86 by the consumer may be required. The financial situation database may contain information that implies or explicitly describes behaviors of a consumer at a particular time or over a period of time.

Each of the output premise producers is created, organized, and supervised by a manager process 36. Each of the output premise producers is created, for example, in response to a corresponding request 38 for an output premise that is received from the advice generator 22 based on information 39 received from the user interface as the consumer interacts with it.

A wide variety of cases (e.g., questions, choices, comments, or other aspects of the consumer's financial situation) can arise during the course of a consumer's interaction with the user interface. Many of the cases correspond to requests for advice that are recognized by the advice generator. In many situations, the advice generator itself can recognize the need for giving advice without the consumer taken an active step. For each kind of advice needed, the advice generator can issue a corresponding request 38 of a particular type along with information 40 that may be useful in providing advice in response to the request.

Based on the type of request issued by the advice generator, the manager process creates, organizes, and supervises the operation of one or more output premise producers to generate one or more output premises for the advice generator based on the information 40 and the facts 28. Once the advice is given, the manager process terminates the output premise producers and waits to act on the next request from the advice generator.

We have mentioned only one consumer, but the steps that we have described (and others to be described) can be replicated for requests triggered by a potentially very large number of other consumers with respect to their financial situations and for requests triggered over very long periods of time.

The manager process 36 creates each output premise producer by spawning a set of one or more intermediate premise generators 41 based on the type of request that has been received. The manager process then organizes and supervises the executions of the intermediate premise generators to use the facts and to interact with one another in a predefined way that is intended to produce a "correct" output premise. The manager process causes that output premise to be sent to the advice generator.

The servers persistently maintain databases (or tables) of facts. The databases include a user profile database 42, a user financial situation database 44, a product database 46, and a statistically useful facts (which we sometimes call simply "statistics") database 47, among others. The manager process uses the facts in the databases in organizing and supervising the operation of the output premise producers for each received request.

Each of the intermediate premise generators that is spawned by the manager process is an instantiation of an intermediate premise generator model 48. Each of the intermediate premise generator models is designed to produce a particular kind of intermediate premise 49 as its output by applying a particular computational process 51 to particular inputs 53. In some cases the inputs are facts stored in the databases. In some cases the inputs are intermediate premises generated by other premise generators.

Each of the output premise producers in turn can be defined by a selection of particular generator models, by connections that the intermediate premises of some of the corresponding premise generators provide in the form of inputs to other intermediate premise generators, and by specifying other ways in which the outputs can be used in combinations or cooperatively.

Each of the computational processes of each of the intermediate premise generators is normally either a statistical process or an analytical process.

Each of the analytical processes can take as inputs facts from the databases and interaction from the user that represent a case. Each of the analytical processes can then apply an inference engine (or similar process) to a set of expert rules based on the input facts.

Each of the statistical processes is typically trained using data from the statistically useful facts database and known correct results for the training cases, so that at run time the statistical process represents a predictive model that can accept input facts for a case and predict an intermediate premise based on the case.

Each of the intermediate premise generator models is created and maintained by a subject matter expert or other developer 60 who works through a user interface 62 of a user device 64. The user interface 62 communicates through the Internet 16 with a developer interaction process 66 running on the servers. The developers also create and maintain output premise producer templates.

The developer interaction process 66 enables the developer to do the following tasks:

1. Define, update, and remove each intermediate premise generator model including the inputs that it needs, the nature of the computational process that it executes, and the nature of the intermediate premise that it produces. The intermediate premise generator models are stored in a database 67. With respect to analytical processes that requires rules, the developer can enter the rules using the developer interaction process. The rules are stored in the rules database 69 for use at runtime.

2. Cause an intermediate premise generator model that includes a statistical process to be trained using specified statistically useful data.

3. Define, update, and create output premise producer templates for responding to defined requests. The templates (which are stored in a template database 63) define, for each kind of output premise producer that may be needed, the sources of data to be used by each of the output premise producer's intermediate premise generators and the manner in which the intermediate premises generated by the intermediate premise generators are to be used in forming an output premise. For example, the latter can include strategies for cooperation of the intermediate premise generators in forming the output premise.

4. Validate and verify each of the intermediate premise generator models and the output premise producers and have it authorized for run-time use.

On the other hand, the developer interaction process 66 is arranged to prevent a developer from altering any of the intermediate premise generator models or any of the output premise producer templates during runtime or from altering them without testing, verification, and approval by an appropriate authority.

The processes running on the servers and the databases maintained by them can be thought of as organized to form two platforms. One platform is a financial advice platform 70 that interacts with the consumer and provides advice to the consumer. The other platform is a computational platform that interacts with experts and developers and uses the models and templates that they produce to generate information useful to the financial advice platform in giving advice to the consumer. The components that comprise each of the two platforms as shown in FIG. 1 need not be divided in the manner shown. A wide variety of organizational principles can be applied.

Not all of the elements need to be included in either of the platforms, other elements could be included, and in some instances all elements could be part of a single platform that could be characterized either as a computational platform or a financial advice platform. The financial advice platform could be supported by and part of the computational platform or vice versa.

We use the term "advice" broadly to include, for example, any kind of recommendation, suggestion, guidance, training, comment, or other similar information. We use the term "financial situation" broadly to include, for example, any aspect of a financial condition, such as accounts, loans, taxes, products, services, plans, strategies, demographics, expenses, investments, liabilities, or assets, among others. We use the term "case" broadly to include, for example, any instance, occurrence, opportunity, context, or event, among other things, that is susceptible to analysis or statistical study. We use the term "facts" broadly to include, for example, any piece of information or data, among other things, that expresses something that is true or accurate or credible or can be considered to be true or accurate or credible with respect to a case or a financial situation or a consumer or a product.

In some implementations of a financial advice platform, the advice provided to the consumers (and the underlying premises) are complete, truthful, accurate, unbiased, and free of hidden interests, for example, free of a commission agreement with a supplier of a financial product. In this respect we sometimes refer to premises or advice as being "correct" or "true." Therefore, the financial advice platform of our example has attributes similar to a human fiduciary who serves as a financial adviser.

For a financial advice platform to be useful over a long period to a typical consumer, the advice provided must take account of dynamic changes (sometimes frequent or significant changes) in the details of the consumer's finances and personal situation, in the attributes of the products that are offered in the marketplace, and in current thinking (known by experts for example) about the best advice that can be given corresponding to a consumer's financial situation and the available products.

Among other benefits, the computational platform that we describe here and that supports the financial advice platform in the examples that we discuss, can be kept current and adapt to frequent and significant changes, based, for example, on updates initiated by experts or other developers. Yet the computational platform remains stable in the face of the updates because of the way in which it ingests and uses such changes by screening control of the operation of the computational platform from the experts or other developers.

When human fiduciaries advise consumers, they sometimes make subjective and multiple recommendations based on the consumers' financial situations. To motivate consumers to accept and act on financial advice, explanations of the basis for the advice can be helpful. The financial platform that we describe here is capable of providing such explanations as part of the advice 10, based on explanations stored and provided by the output premise producers 26. Consumers often need advice with respect to a wide range of different financial decisions and other financial situations (that is, different cases) that require different types of analysis and statistical study and the providing of different kinds of advice over time. For example, a case that involves advising a consumer on a good cell phone plan may require a different analytical or statistical approach from one that may work best for a case that involves advising the consumer on whether to transfer her credit card debt balance to lower rate credit card versus getting a personal loan to pay off the balance. A variety of types of advice may apply to the range of financial decisions and financial situations (cases) of a typical consumer over time. In some cases, what is required is a simple prediction. In some cases, a more complex strategic recommendation is needed, for example.

Other kinds of advice may also be useful in other cases, for example, suggestions of the order in which the consumer should address financial issues that have been identified. In some cases the advice may be a behavioral recommendation.

For instance, instead of recommending a transfer of a credit card balance to a 0% promotional interest rate card with an additional credit line, a recommendation can be made to pay off the balance using a personal loan and moving all future purchases to a debit card. The latter recommendation entails a behavioral change in the sense that a debit card is supported by an existing balance while the consumer's use of the credit card increases debt.

In some instances, advice can entail products offered in multiple forms or as multiple products. For example, rather than recommending that a consumer get only one credit card, the financial advice platform may recommend getting a new credit card immediately and then in several months adding another card for a portion of the user's spending. The financial advice platform may also recommend that a consumer unbundle certain products and split them among multiple providers. For instance, in a cell phone recommendation the financial advice platform may recommend that one or more parties in a bundled plan should stay with their existing carrier, but that other members should migrate to a new carrier to optimize the monthly expense. The financial advice platform may make time limited recommendations rather than open ended recommendations in which the advice specifies a time or a time window in which the recommendation is to be completed. For example the financial advice platform may recommend that a consumer stop using his credit card for a specific amount of time.

In some implementations, the statistical processes used in the computational platform include algorithms and utilities of the Apache Spark MLib. The machine learning algorithms include classification, regression, clustering, collaborative filtering, dimensional reduction, and lower level optimization primitives and higher-level pipeline APIs, and combinations of them. Particular algorithms can use decision trees, random forests, gradient-boosted trees, or naïve Bayes approaches, among others, and combinations of them.

The analytical processes of interim premise generators used in the computational platform typically receives the rules defined by the human experts (by a process that protects computational platform from corruption and makes it highly scalable). The rules can be used to determine correct outcomes (e.g., logical consequences in the form of output premises or interim premises) directly from facts 48 for cases being analyzed. The rules represent conceptual notions of the experts that can be the basis for generating the correct outputs (e.g., generating an interim premise or an output premise).

In some cases, the analytical processes and the statistical processes (e.g., the interim premise generators of which they are part) can be managed, or supervised, or in other ways caused to cooperate to produce more useful outputs than would otherwise be possible if only analytical processes or only statistical processes were used for a given case.

In some implementations, the analytical processes (which we also sometimes call inference machinery) can be developed and implemented using an Apache Jena Java framework. The Jena framework permits a variety of inference engines and semantic reasoners to be used and uses Resource Description Frameworks (RDFs) to generate additional assertions from base RDFs, optional ontology information, and rules of the analytical processes.

In some examples, there are at least three modes provided for execution of rules by the analytical processes. In a sequential mode, the rules are based on high level concepts imparted by the human experts and are executed in a prioritized sequence with the most important ones being executed first. When a correct output (an interim premise or an output premise, for example) is generated during a sequence of executions, the rest of the rules are skipped. In a parallel mode, the rules are based on the high level concepts mixed with facts and are executed in parallel to produce, possibly, multiple correct outputs. During execution in the parallel mode, none of the rules is skipped. In the third, modularized and hierarchical mode, the high level concept-based rules are grouped into modules. Execution of the modules is arranged to mimic the thought processes of the human experts (for example, financial advisors). Correct outputs (premises, for example) can be generated by any of the modules upon the execution of any of the rules of the module. Any such correct output can be revoked during the later execution of a rule of any of the modules based on more detailed information.

As mentioned earlier, the computational platform 72 provides a manager process 36 that can cause the analytical processes and statistical processes (e.g., the interim premise generators of which they are part) to cooperate in providing correct outputs premises for incoming facts for particular cases. By virtue of such cooperation, the computational platform 72 can operate more effectively to provide outputs that take advantage of statistical processes to aid analytical processes when analytical processes are not sufficiently effective, and to take advantage of analytical processes to aid statistical process was when statistical processes are not sufficiently effective, or to do both.

For example when high-level concepts of experts have been embedded in rules, statistical processes can help the analytical processes to find the best correct interim premise or output premise faster by applying statistical evaluation and optimization techniques such as accuracy, precision, recall, and others. In addition, the statistical processes can help the analytical processes to adapt to changes in incoming facts, for example, the ingestion of more facts or the ingestion of facts from new or different sources by retraining a model statistically. Statistical processes also can discover logical or causal relationships among high-level concepts embodied in the rules that human experts who created the rules may have ignored or not noticed. In addition, the statistical methods can provide explanations for how the correct outputs were derived, explanations that can be useful for humans who design rules in understanding the facts or in suggesting other high-level concepts for incorporation into rules.

Conversely, analytical processes can supplement and improve correct outputs that would be generated by statistical processes to deal with difficulties encountered in applying the statistical processes. For example, statistical processes may not effectively identify features of the data that should be included in the process of generating the interim premises or the output premises 24, 49. Typically, a statistical process assumes the identity of the relevant features to be processed in the data. Analytical processes, by contrast, require human experts to review their thinking processes, identify the high level concepts, and derive those concepts from available data. With respect to preparation of training facts, analytical processes can operate when training facts are not readily available and can produce rules that are consistent with human expert thinking. Therefore, analytical processes can help statistical processes to acquire the necessary training facts.

The financial advice platform can provide a wide variety of types of observations, guidance, advice, suggestions, and recommendations to each of the consumers over time. As noted earlier, we refer to these forms of assistance, and others, together broadly by the general term "advice." In order to be accurate, correct, and consistent with the operation of the financial advice platform as a fiduciary, each interim premise, output premise, and advice conveyed to the consumer must be carefully derived. Each premise and the advice should be based on facts, on the kinds of inferences that would be drawn from those facts by expert fiduciaries, and by an understanding of how the financial outcomes of other consumers in similar financial situations bear on predictions of the financial outcomes for the given consumer.

The financial advice platform need not provide merely a single set of advice for each consumer at a given moment in time. Rather, it is designed to provide many individual and combined pieces of advice with respect to various aspects of a consumer's finances over time (for example over a long period of time extending in some cases for an entire lifetime). The facts are dynamic. As time passes, the facts stored in the databases change, sometimes rapidly. The contexts in which specific advice is offered and the timing of those pieces of advice require the financial advice platform and the computational platform to bring to bear on the facts different combinations of inferences and statistical understandings. In some cases, a premise and the resulting advice can be easily derived by a single inference from a certain set of facts about the consumer. In some cases, a premise and the resulting advice can be easily derived by a simple comparison of the consumer's circumstances to similar circumstances of a large number of similarly situated other consumers. In some cases, a premise and the resulting advice must depend on a combination of inferences and statistical analysis in order to be accurate and unbiased.

As shown in FIG. 2 and as mentioned earlier, the computational platform 72 is structured to provide and to execute one or more (up to a very large number) of instances of interim premise generators 90 (which we also sometimes call simply "brains"). Each premise generator takes as inputs facts 92 from the databases, or the results of straightforward data analysis 94 of facts from the database such as monthly_income, account_history, debt_tenure, average_interest_rate, payment_behavior, or one or more premises 96 and generates as output one or more interim premises 98. Each instance of an interim premise generator uses analytical processes 32 or statistical processes 34 or in some cases a combination of the two of them to generate the output premises.

Each of the output premise producers can be thought of as a structured combination of interim premise generators.

Referring again to FIG. 3, as a simple example, an output premise producer of the computational platform could include three instances of interim premise generators 100, 102, and 104. In this example, interim premise generator 100 produces as its output an interim premise 106 that is a prediction whether an application for a personal loan by a particular consumer will be accepted or rejected and, if accepted, the interest rate that will apply. The interim premise generator 102 produces as its output an interim premise 108 that is a prediction of whether an application for a credit card will be accepted or rejected and, if accepted, the interest rate that will apply. Both interim premise generators 100 and 102 take as an input a customer profile data analysis 110 that is based on facts stored in the databases that relate to the demographics and behavior of the consumer. Interim premise generator 100 takes as another input facts that represent historical data about personal loan applications 112 made by the given consumer and the outcomes of those applications. Interim premise generator 102 takes as another input facts that represent historical data about credit card applications 114 made by the given consumer and the outcomes of those applications. Interim premise generators 100 and 102 can use statistical processes and analytical processes as the basis for generating their interim premises.

Interim premise generator 104 takes as inputs the interim premises that were the outputs of interim premise generators 100 and 102 and can apply analytical processes and statistical processes to derive a strategy recommendation 120 as the output premise of the overall output premise producer 109.

In a specific case, the strategy recommendation could be to apply for a credit card that has certain application requirements and financial terms. That output premise is provided directly to the advice generator 22 (FIG. 1) which uses the output premise to drive a search 122 of the product database 80 for a product or products that conform to the strategy recommendation. If none can be found, the interim premise generator 104 is notified 105 and it develops an alternative strategy recommendation (output premise) for consideration by the advice generator. Once the advice generator identifies a product that satisfies the strategy recommendation, the recommendation is provided to the consumer through the user interface.

We have discussed only a few simple examples. Operational financial advice and computational platforms could take advantage of hundreds or thousands of instances of interim premise generators spawned and executed by the computational platform.

As mentioned earlier, in general, the developers do not have direct access to the structure or constituent instances of interim premise generators or output premise producers that belong to the computational platform. And the sources of facts, product information, and other data used by the computational platform do not have access to the inner workings of the computational platform. This screening of the structure and operation of the computational platform from developers and sources of data helps to assure that the computational platform operates stably and is highly scalable. Therefore, parties who are engaged in developing a financial advice platform (or a wide variety of other platforms for use in other contexts) can separately develop a stable, accurate, scalable, unbiased computational platform to provide a wide variety of output premises that are useful to the financial advice platform in providing advice to consumers in a fiduciary mode.

Figure 4:
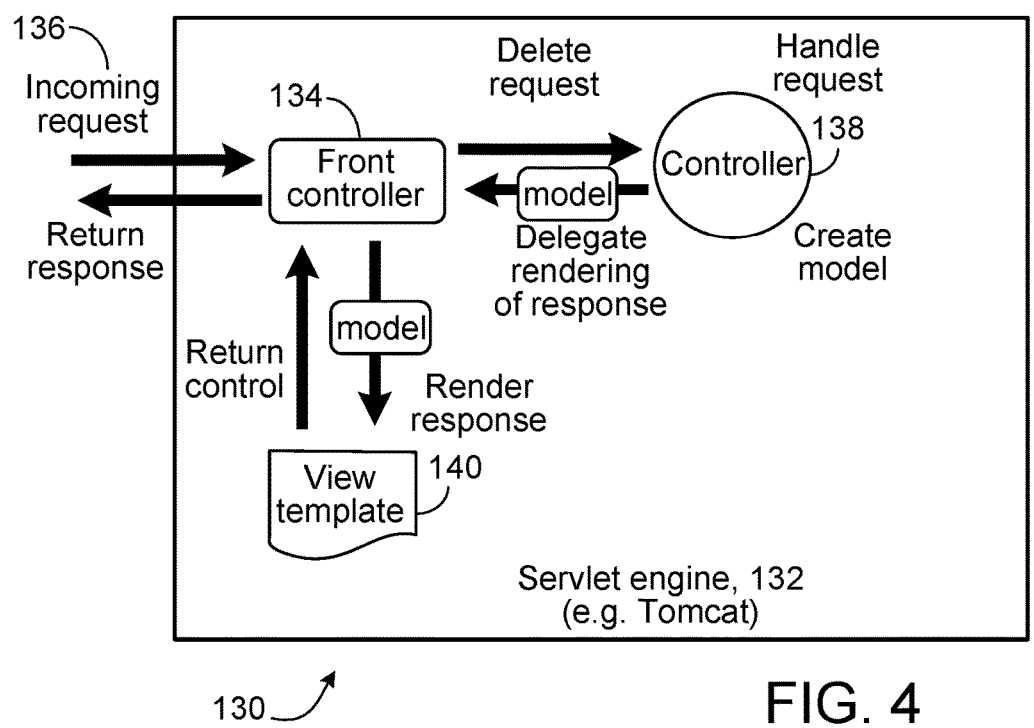

As shown in FIG. 4, in some implementations of the computational platform, a Spring MVC web component 130 of a Spring framework can be used to manage the creation of each of the interim premise generator models. A servlet engine 132 includes a front controller 134 that receives an incoming request 136 from the developer for the generation of an interim premise generator model. The front controller 134 delegates the request to a controller 138 that handles the request by spawning an instance of an appropriate interim premise generator model. When the model is created the controller 138 delegates the rendering of the response to the front controller 134. The front controller 134 then forwards the model information to a view template 140 to cause it to render a response to the developer. Once rendered, the view template returns control of the front controller which then returns a response to the developer. Through the view template, the developer is able to define configurable parameters of the interim premise generator model, the data objects to be used to present the interim premise of the interim premise generator, and the attributes of the statistical process or analytical process or both used to generate the interim premise.

When an interim premise generator model is created by a developer, the computational platform stores a centralized configuration file and a directory to store machine learning statistical processes (models) and rules associated with analytical processes.

The configuration file contains options for controlling the behaviors of brains, for example, what kinds of keywords will trigger premises or explanations for users, or requests for data from users. The directory stores the files that represent the rule models or machine learning models that the brain should load and execute.

Referring again to FIG. 1, the manager process 36 manages in memory the objects that represent interim premise generators in the computational platform. The manager can add, delete, or update each instance of the interim premise generator in memory as needed. The manager also can clear the memory after the analytical or statistical processes of the instance have been executed. The manager provides a machine learning environment that enables the execution of the instances of the interim premise generators as needed.

The manager therefore can support the generation of the output premises and explanations requested by the financial advice platform using specific instances of the interim premise generators and combinations of them; execution of all of the instances of the interim premise generators, a vote of the instances of the interim premise generators, or prioritized results from all or selected instances of the interim premise generators. The manager also supports data object-based user interfaces for the developers, can monitor online performance, and can record all premises generated by the interim premise generators.

The interim premise generators, as mentioned above, can represent any kind of statistical process or analytical process or a combination of them as needed to generate useful premises for the financial advice platform. In the case of analytical processes, the rules can be expressed as Jena rules in N3 format or any other applicable semantic web model such as RDF, OWL, OWL lite, and others. Statistical processes can be represented by a wide range of machine learning techniques including classification, regression, or clustering to name a few. Many such techniques are available in Spark MLib library. Training of the statistical processes can be done off-line due to the potentially large amount of resource consumption needed for such training.

An important feature of the computational platform is the ability to apply a combination of analytical processes and statistical processes to generate an interim or output premise based on inputs.

An example of the value of such a combination is a situation in which the computational platform is to generate a premise about the ability of a consumer to get a personal loan. The statistics database store facts about thousands of consumers and their personal loan application successes and failures and will contain a significant amount of consistent information about a large set of consumers who have had various successes and failures associated with their financial situations. There may also be a small number of consumers who, for example, have undergone three successive personal bankruptcies but have never applied for a personal loan. If a consumer for whom the financial advice platform is to provide advice happens to be one who has undergone three successive personal bankruptcies, a conventional statistical process based on training and classification would be unable to provide a useful premise. But an analytical process could include a simple rule: "A consumer who has three times declared bankruptcy will never get a personal loan and should not bother trying." By combining the outputs of the two processes, the premise generator upon running its statistical processes could recognize its inability to generate a useful premise and could defer to the analytical process to generate the premise advising the consumer not to bother trying.

A wide variety of cooperative arrangements between analytical processes and statistical processes is possible.

For example, the computational platform could be operated to provide for voting among computational processes, for example, between analytical processes and statistical processes. In some instances, the output premise of the computational platform could reflect "majority voting", that is, the interim premise generated by each brain (statistical or analytical) would have a "vote" in the output premise of the computational platform, and the majority vote would dictate the output premise of the computational platform. Majority voting has been used in safety-oriented design to assure calculation correctness.

In financial advising, for example, for debt management strategy, different mechanism are designed from different perspectives:

1. Some brains can be designed to provide a conservative approach to manage debts. Such rules are slower, more costly, and easier to deploy.
2. Some brains can be designed to aggressively and quickly reduce debt but carry high risks of failure.
3. Some brains can be designed to balance considerations about economic behavior, for example, balance between payment and cost.
4. Some brains can be in the form of random forests (stable decision structures) or decision trees (unstable decision structures) trained by data collected from a particular source, for example, data indicating what people usually will do, as observed by the particular source.
5. Some brains can use naïve Bayes algorithms trained by data collected by survey, e.g., algorithms that provide predictions based on probabilities of what surveyed people will decide to do.

Therefore, in some applications of a computational platform, the voting can ignore the differences of the characteristics of the brains that are doing the voting and simply act on the majority vote.

In some schemes, the priority of consideration of the interim premises generated by different brains (of the various kinds discussed above) can be specified by user preference. In financial advising, for example, for debt management strategy, different brains can be designed from different perspectives (as discussed above). The computational platform, acting through the financial advice platform, can ask users for their preferences in advance and set the priority for acceptance of interim premises of different brains based on the expressed preferences.

If reducing an overall cost is the highest expressed preference of the user and the user wishes to reduce debt as fast as possible, then the recommendation from brain 2 (above) is accepted as the output premise of the computational platform to be provided to the financial advice platform and forwarded by that platform as advice to the user. If brain 2 fails to generate an interim premise, then the output of brain 3 is accepted. If brain 3 also fails to generate an interim premise, then the interim premise of brain 1 is accepted. If all three brains 1, 2, and 3 fail to generate interim premises, then the interim premise, if any, is accepted from brain 4 or brain 5.

In some approaches, the interim premises of one or more different brains (e.g., brains 1 through 5 above) can be accepted based on a user's decision. The interim premises of the different brains can be shown to the user by the financial advice platform and the user can then make a choice among them.

In some approaches used by a computational platform, the output premise of the computational platform is a hybrid of the interim premises of the brains based on the condition that there is a high confidence level in the interim premises of a "main" brain, but the main brain can only be applied in to a limited value range of input facts. In financial advising, for example, for debt management strategy, different mechanism are designed from different perspectives. As part of the operation of the computational platform, before input facts are applied to a "main" brain, a check is made whether the user's profile falls within the supported range of input facts.

For example, if the bankruptcy history of the user entails fewer than one bankruptcy, then the main brain can be applied. Otherwise the computational platform is caused to jump to a second input fact consideration, mentioned below. If the number of bankruptcies is less than 1, brains are executed that implement Gradient-Boosted Trees (GBTs) that have been trained by data collected from Lending Club (a marketplace lender that matches lenders with borrowers in an online two-sided marketplace) about who is likely to get approved for a personal loan. The prediction is then taken as the output premise of the computational platform and delivered to the financial advice platform which forwards it as advice to the user. If, on the other hand, the number of bankruptcies is outside of the range that can be handled by the brain, for example, because there have been three or more bankruptcies of the user, the computational platform causes the input range to be handled by a different brain and the interim premise of that other brain is provided as advice to the user. In other words, if someone has filed bankruptcy three times, the computational platform will not provide an output premise that recommends applying for a personal loan, for safety reasons. The limitation in the range of input facts in cases of this kind will often be due to a lack of sufficient available data to train the brain, for example, because it is not frequent for people to file bankruptcy.

In some approaches to the operation of the computational platform, brains that implement statistical processes are applied first and their interim premises verified (audited) by one or more brains that apply analytical processes. The output premise of the computational platform is a hybrid of the interim premises of the different applied brains.

For example, first brains can be executed that implement Gradient-Boosted Trees (GBTs) that have been trained by data about who is likely to get approved for a personal loan. If the number of bankruptcies is outside of the range that can be handled by the brain, for example, because there have been three or more bankruptcies of the user, the computational platform causes a brain to search rules for special cases. If special cases are found, they can be applied and the interim premises of that brain can be used to overwrite the interim premises of the Gradient-Boosted Trees brains. This approach effectively always rejects a recommendation of a personal loan for a user who has filed bankruptcy three times, for safety reasons. A similar approach can be used to protect the limitations on brains that rely on machine learning due to unavailable training data, or legal constraints. For example, it may be illegal to provide a personal loan to someone who has filed for bankruptcy.

In some approaches to the operation of a computational platform, the interim premises of brains that apply analytical processes are used as the output premises of the computational platform unless those brains fail, in which case the interim premises of brains that apply statistical processes are used. For example, the interim premise of a brain of the kind described in item 3 above can be used first, then the interim premise of the brain of the kind described in item 1, then brain 2, brain 4, and brain 5. In effect, the computational platform establishes the principle that the "best" interim premise should be provided and establishes a fixed sequence in which the interim premises of the brains will be used. A brain may be considered to have failed if, for example, the brain provides an output that indicates that it could not have provided a reliable solution based on the input values the brain was presented with, in other words that the brain does not have an answer.

In some cases, the computational platform can divide a task into a set of sub-tasks and permit the interim premises of the brains that implement the subtasks to affect the overall output of the computational platform. For example, one brain can use a random forest approach to predict the acceptance or rejection and the estimated rate of the personal loan. Note that multiple brains can be applied to this sub-task. One brain can use a naïve Bayes approach to predict acceptance or rejection and the estimated rate for a credit card application. Multiple brains could be applied to execute this sub-task. The computational platform then applies a coordination mechanism in another brain to make the strategy recommendation that is the output premise of the computational platform.

The advice given to consumers by the financial advice platform is given through the user interface (e.g., a graphical user interface or GUI) running on a mobile device or through a browser, for example. Information about such a user interface can be found in the patent applications identified above. In addition, the following user interface features and corresponding aspects of the advice can be provided to users.

Advice to consumers can include the following components: 1) opportunities to save money, improve the client's financial condition, or change a financial product or service; 2) strategies to act on the opportunities; 3) options for following strategies recommended by the system and chosen by the client; 4) product, service, or behavior recommendations for implementing selected strategy options; and 5) action plans for helping the client fully complete a strategy and product recommendation.

Figure 5:
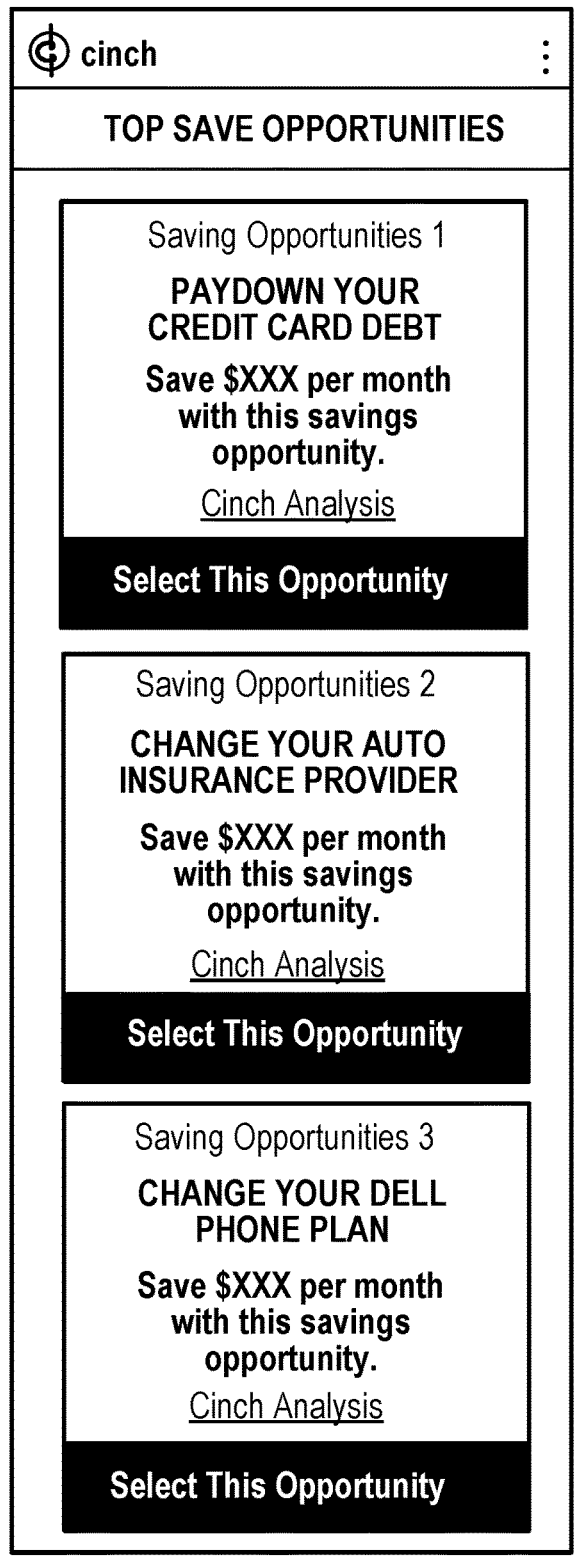

Referring to FIG. 5, the GUI shows the consumer the advice generated by the financial advice platform. In this example, the GUI lists savings opportunities for the consumer that have been identified by the financial advice platform. Savings opportunities are presented in a priority order. The platform generates these savings opportunities based on analysis of the consumer's profile and information in the financial product database. Savings opportunities include, for example, changes in the consumer's finances that will result in saving money on bills or improving the consumer's financial situation. Examples of savings opportunities include refinancing consumer debt, changing insurance providers or coverage, switching cable television and internet providers or plans, changing cell phone plans or providers, and changing a behavior such as changing how the consumer chooses to pay monthly bills or expenses. Consumers will choose which savings opportunity to pursue, and the system will then provide the consumer with one or more strategies to pursue the selected savings opportunities.

Figure 6:

Referring to FIG. 6, the GUI shows the next step in presenting the advice to clients. After selecting a savings opportunity as shown in FIG. 6, the consumer is presented one or more recommended strategies for acting on the selected savings opportunity. Recommended strategies are generated based on analysis of the possible strategies to complete a savings opportunity. These opportunities are ranked according to an analysis of which is best for the consumer to implement. This ranking takes into consideration total cost of the strategy, the amount of time it would take to complete the strategy, and the overall impact of the strategy on the consumer's financial situation. The GUI includes a description of the strategy and why the strategy is recommended for the consumer. These descriptions can be derived from the explanations provided by the computational platform.

Figure 7:

Referring to FIG. 7, the GUI shows rejected strategies for acting on the selected savings opportunities. Rejected strategies are generated based on analysis of the possible strategies to complete a savings opportunity. Rejected strategies are generated in the same way as Recommended strategies. These are presented to illustrate that as many strategies as possible were considered in making recommended strategies. Rejected strategies include a description of the rejected strategy and reasons why it was rejected by the system for this consumer. Again these descriptions can be derived from the explanations provided by the computational platform.

Figure 8:

Referring to FIG. 8, the GUI shows options for implementing a recommended strategy from FIG. 6. Options include details about what type of product or service would be appropriate to implement the recommended strategy. These options are generated by analysis of the consumer's profile and the information in the financial product database. This includes a "fair price" estimate generated by the computational platform of what the consumer should pay and other terms the consumer should expect when acquiring for the product or service. The "fair price" estimate is a custom estimate for this consumer and is based on analysis of pricing, approval rates, interest rates, fees, and any of the pricing information for a product or service in the product database. This is combined with the consumer's profile, taking into account any appropriate profile information for applying for a product or service, for example credit score, income, location, and job status. The "fair price" is a system-generated prediction of what the consumer should expect to pay for a product or service when obtaining it. Several options will be generated for the consumer, all of which will work in implementing the selected recommended strategy from FIG. 6. All options will include a "fair price" for the product or service listed in the option.

Figure 9:
Figure 10:
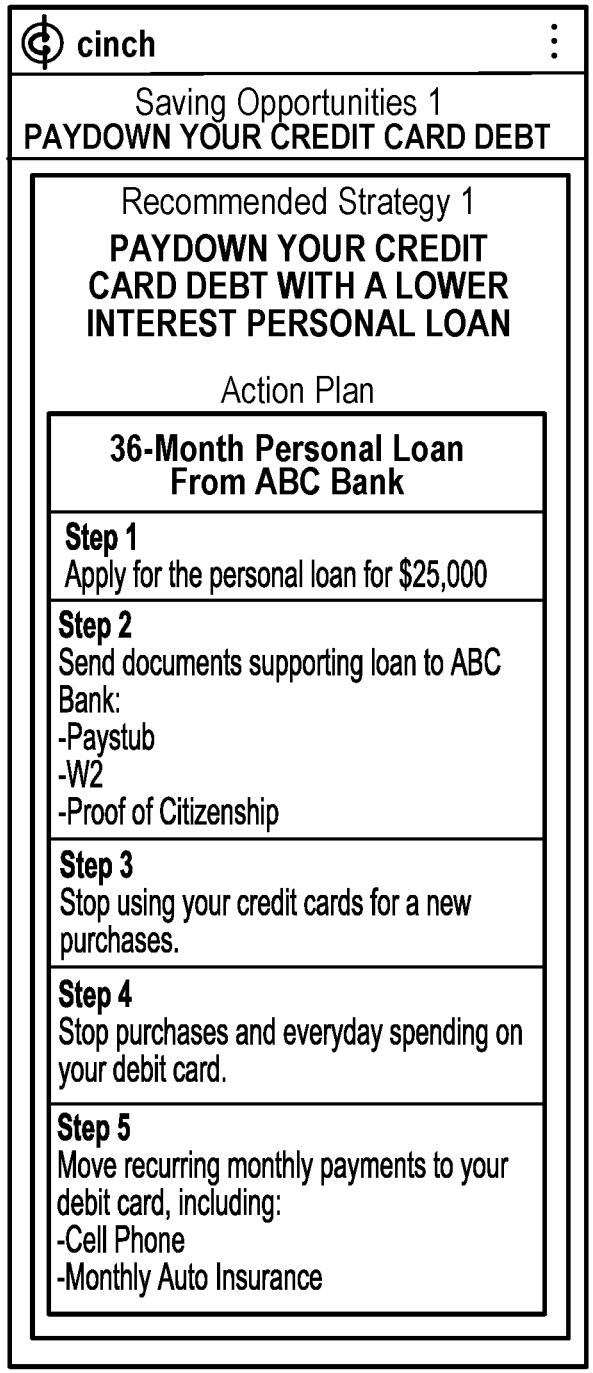

Referring to FIG. 9, the GUI shows provider, service or product recommendations based on a selected option from FIG. 8. This is a provider, service or product that the system has determined is appropriate for the consumer in implementing the selected recommended strategy from FIG. 6 with the selection options from FIG. 8. The provider, service or product recommendation is based on analysis of information for a product or service in the product database. This is combined with the consumer's profile, taking into account any appropriate profile information for applying for a product or service, for example credit score, income, location, and job status. The system will generate several options for the consumer, all of which will work in implementing the selected recommended strategy.

Referring to FIG. 9, the GUI shows an "action plan" for the consumer, which is a series of steps the consumer will need to take to implement the recommended strategy from FIG. 6 with the selected strategy from FIG. 7, the selected options from FIG. 8 and the selected product, service or provider from FIG. 9. An action plan is generated based on the analysis of the consumer's financial profile and the financial product database.

A wide variety of implementations of the systems and techniques that we have described are possible. The implementations can make use of a wide variety of computers, mobile devices, servers, cloud-based facilities, communication networks, software, operating systems, and user interface features.

Among the advantages of the systems and techniques that we have described are one or more of the following. The computational platform is scalable because the interim premise generators are easily instantiated and their interrelationships are easily structured and managed. The computational platform can serve an advice platform that needs a variety of different kinds of premises in different places in the advice platform and at different times. The computational platform is stable, protected from disadvantageous manipulation by developers and easily is scalable to handle a very large number of requests for output premises. The computational platform can deal effectively with data sets that are not easily susceptible at least in some cases to machine learning statistical techniques alone or analytical techniques alone. Each output premise producer can make combined use of the two. The financial advice platform can be built out easily, be scalable, and be highly adaptable. The goal of fiduciary behavior is served.

Other implementations are also within the scope of the following claims

The invention claimed is:

1. A computer implemented method comprising
by computer, over a period of time engaging in an ongoing succession of related operations each of which comprises receiving an item of input data representing a case or generating an output premise, at least some of the output premises being generated between the receiving of successive items of input data,
the items of input data received in the succession of related operations representing information about unpredictable human economic behavior, the output premises generated in the succession of related operations representing advice concerning the unpredictable human economic behavior,
the generating of one or more of the output premises comprising:
by computer running (a) a first interim premise generator to apply a first computational process to one of the received items of input data to generate first interim data, and (b) a second interim premise generator to apply a second computational process to the first interim data to generate second interim data, and
by computer managing the running of the first interim premise generator and the second interim premise generator so that (a) the first computational process comprises an analytical computational process and the second computational process comprises a statistical computational process, or (b) the first computational process comprises a statistical computational process and the second computational process comprises an analytical computational process, the output premise being based on at least the second interim data generated by the second interim premise generator,
the statistical computational process being based on statistical features of a body of statistical data about human economic behavior and adapts to changes in the body of statistical data.

2. The method of claim 1 in which the running of the first interim premise generator and the second interim premise generator is managed by applying a cooperation logic to results of the analytical computational process and results of the statistical computational process.

3. The method of claim 2 in which the cooperation logic comprises treating results of the analytical computational process and results of the statistical computational process as votes in a majority voting process.

4. The method of claim 2 in which the cooperation logic comprises treating results of the analytical computational process and results of the statistical computational process in an order of priority determined by a user.

5. The method of claim 2 in which the cooperation logic comprises treating results of the analytical computational process and results of the computational process processing in accordance with a choice made by a user.

6. The method of claim 2 in which the cooperation logic comprises treating results of the analytical computational process and results of the statistical computational process based on confidence levels.

7. The method of claim 6 in which the confidence levels are associated with ranges of the received data associated with the analytical computational process or the statistical computational process or with both.

8. The method of claim 1 in which the analytical computational process and the statistical computational process comprise respective processing perspectives, and the managing is based on the respective processing perspectives.

9. The method of claim 8 in which at least one of the respective processing perspectives comprises balancing factors associated with the case.

10. The method of claim 8 in which at least one of the respective processing perspectives comprises applying inferences derived from computational analysis of data for other similar cases.

11. The method of claim 10 in which the inferences are derived using trained random forests or decision trees.

12. The method of claim 10 in which the inferences are derived using trained naïve Bayes algorithms.

13. The method of claim 1 in which the analytical computational process and the statistical computational process are managed so that the output premise represents a hybrid of results of the analytical computational process and the statistical computational process.

14. The method of claim 13 in which the statistical computational process is applied first and a result of the statistical computational process is audited by the analytical computational process.

15. The method of claim 13 in which a result of the analytical computational process is used as the output premise unless the analytical computational process fails.

16. The method of claim 1 in which managing the analytical computational process and the statistical computational process comprises assigning subtasks to instances of analytical computational process or statistical computational process or on both.

* * * * *